(12) United States Patent
Honjo

(10) Patent No.: US 12,155,699 B2
(45) Date of Patent: Nov. 26, 2024

(54) IMAGING APPARATUS, CONTROL METHOD OF THE SAME, AND RECORDING MEDIUM

(71) Applicant: CANON KABUSHIKI KAISHA, Tokyo (JP)

(72) Inventor: Wataru Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/190,859

(22) Filed: Mar. 27, 2023

(65) Prior Publication Data

US 2023/0319119 A1    Oct. 5, 2023

(30) Foreign Application Priority Data

Mar. 31, 2022 (JP) ................................. 2022-061233

(51) Int. Cl.
*H04L 65/1069* (2022.01)
*H04L 65/65* (2022.01)
*H04N 23/51* (2023.01)

(52) U.S. Cl.
CPC .......... *H04L 65/1069* (2013.01); *H04L 65/65* (2022.05); *H04N 23/51* (2023.01)

(58) Field of Classification Search
CPC .... H04N 23/661; H04N 23/695; H04N 7/183; H04N 5/77; H04L 65/65
See application file for complete search history.

(56) References Cited

U.S. PATENT DOCUMENTS

| | | | | |
|---|---|---|---|---|
| 11,412,021 B2* | 8/2022 | Shin | ........................ | H04L 65/65 |
| 11,765,469 B2* | 9/2023 | Aramaki | .............. | H04N 23/661 |
| | | | | 348/222.1 |
| 2018/0276962 A1* | 9/2018 | Butler | .............. | G08B 13/19669 |
| 2019/0370992 A1* | 12/2019 | Takami | ................ | G06V 30/413 |
| 2020/0036763 A1* | 1/2020 | Honjo | ..................... | H04L 65/65 |
| 2021/0281886 A1* | 9/2021 | Kota | ..................... | H04W 84/02 |
| 2023/0169577 A1* | 6/2023 | Morgan | .................... | G06T 7/50 |
| | | | | 705/27.2 |

FOREIGN PATENT DOCUMENTS

EP      3873087 A2 *  9/2021  ....... G06K 19/07732

OTHER PUBLICATIONS

Open Network Video Interface Forum Core Specification Version 1.02 Jun. 2010, pp. 1-236 (Year: 2010).*
ONVIF™ Streaming Specification, Version 19.12, Dec. 2019.

* cited by examiner

*Primary Examiner* — Chirag R Patel
(74) *Attorney, Agent, or Firm* — Canon U.S.A., Inc. IP Division

(57) ABSTRACT

An imaging apparatus capable of audio communication with a client apparatus in an established session with the client apparatus, the imaging apparatus establishing a session with the client apparatus, accepting a request for establishment of the session from a user, transmitting, in a case where the request for establishment of the session is accepted, a notification compliant with the Open Network Video Interface Forum (ONVIF) standard to the client apparatus as a notification that requests establishment of the session.

12 Claims, 5 Drawing Sheets

IMAGING APPARATUS, CONTROL METHOD OF THE SAME, AND RECORDING MEDIUM

BACKGROUND OF THE DISCLOSURE

Field of the Disclosure

The present disclosure relates to an imaging apparatus, a control method of the same, and a recording medium.

Description of the Related Art

It is a conventionally common practice that a camera and a video receiving client apparatus connected via a network use a function of bidirectional audio communication realized by utilizing audio distribution and audio transmission (back channel) from the client apparatus to the camera.

The Open Network Video Interface Forum (ONVIF) standard is an open standard for connection between a monitoring camera and a video-receiving client apparatus, and functions related to video and audio distribution and back channel are standardized.

In the devices compliant with the ONVIF standard, Real Time Streaming Protocol (RTSP) is used to establish a session of bidirectional audio communication. The bidirectional audio communication using the RTSP requires an RTSP request for establishment of a session to be sent from the client apparatus (ONVIF Streaming Specification (https://www.onvulif.org/specs/stream/ONVIF-Streaming-Spec.pdf)).

In a case of a monitoring camera, for example, a back channel is generally used for a user of the client apparatus monitoring an imaged target to speak to the imaged target. The back channel can also be used for audio communication in combination with audio distribution from the camera to the client apparatus. This usage case sometimes leads to a situation where a request for establishment of a session is desired to be issued from a user of the camera other than from the user of the client apparatus as described above. Examples of the configuration involving audio communication include a case using a camera that is wearable by a user and supports bidirectional audio communication with the user of the client apparatus.

However, a normal RTSP does not support establishment of a session starting by a request from the camera. In addition, in a case where a session is closed by the client apparatus, the session cannot be re-established by an operation performed on the camera. Thus, there is a need for sending a request for audio communication from the camera to the client apparatus.

The ONVIF standard however does not define the function of issuing a notification that requests establishment of a session. Thus, in the devices compliant with ONVIF standard, a session between an imaging apparatus and a client apparatus cannot be established based on a request from the camera.

SUMMARY OF THE DISCLOSURE

According to an aspect of the present disclosure, an imaging apparatus that is capable of audio communication with a client apparatus in an established session with the client apparatus, the imaging apparatus includes an establishment unit configured to establish a session with the client apparatus, an acceptance unit configured to accept a request for establishment of the session from a user, a transmission unit configured to transmit, in a case where the acceptance unit accepts the request for establishment of the session, a notification compliant with the Open Network Video Interface Forum (ONVIF) standard to the client apparatus as a notification that requests establishment of the session.

According to another aspect of the present disclosure, a control method of an imaging apparatus, the control method includes establishing a session with a client apparatus, accepting a request for establishment of the session from a user, and transmitting, in a case where the request for establishment of the session is accepted, a notification compliant with ONVIF standard to the client apparatus as a notification that requests establishment of the session.

Further features of the present disclosure will become apparent from the following description of exemplary embodiments with reference to the attached drawings.

DESCRIPTION OF THE EMBODIMENTS

Hereinafter, a preferred exemplary embodiment of the present disclosure will be described with reference to the accompanying drawings.

An imaging apparatus according to an exemplary embodiment of the present disclosure will be described below with reference to FIGS. 1 to 5.

Figure 1:
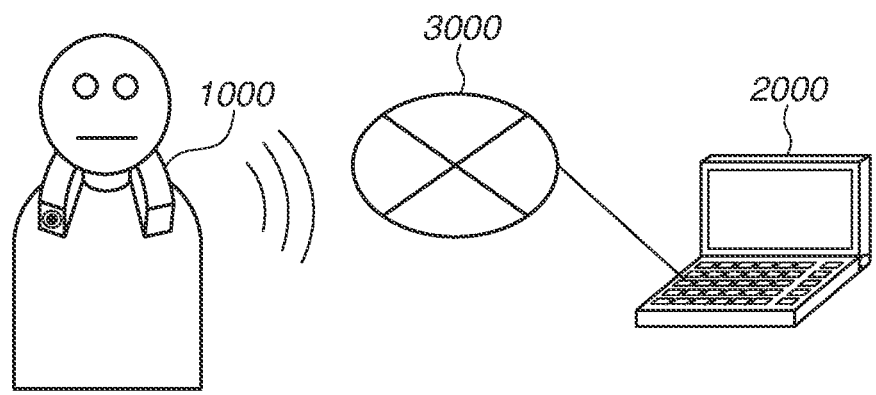
FIG. 1 is a diagram illustrating a network configuration according to an exemplary embodiment of the present disclosure.

FIG. 1 is a network configuration diagram including a camera 1000. A client apparatus 2000 is an external apparatus in the present disclosure. The camera 1000 is a user-wearable imaging apparatus, such as a neckless-type camera that can be put on a user's neck. The camera 1000 and the client apparatus 2000 are connected via a network 3000 and perform mutual communication. The client apparatus 2000 transmits various control commands for, for example, video settings to the camera 1000. The camera 1000 transmits responses to the commands to the client apparatus 2000. The camera 1000 (imaging apparatus) is capable of audio communication with the client apparatus 2000 when a session (Real Time Streaming Protocol (RTSP) session) is established between the camera 1000 and the client apparatus 2000.

Figure 2:
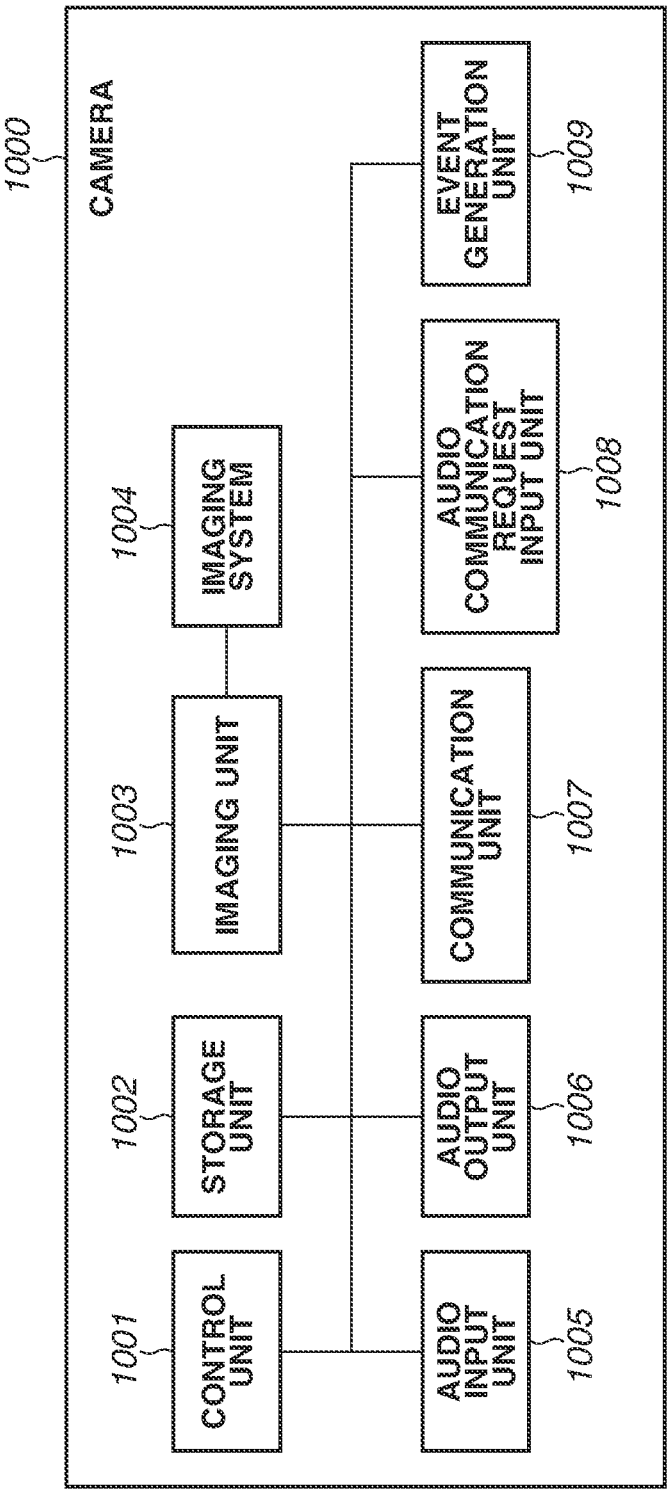
FIG. 2 is a block diagram illustrating an internal configuration of a camera according to the exemplary embodiment of the present disclosure.

FIG. 2 is a block diagram illustrating an internal configuration of the camera 1000.

In FIG. 2, a control unit 1001 controls operation of the camera 1000 (information processing apparatus). The control unit 1001 is a central processing unit (CPU), for example.

A storage unit 1002 is used as a program storage area of programs that is executed mainly by the control unit 1001, a work area during execution of a program, and a storage area of various kinds of data, such as a temporary storage area of image data generated by an imaging unit 1003 described below.

The imaging unit 1003 converts an analog signal, which is acquired by capturing a subject image formed by an imaging system 1004 described below of the camera 1000, into digital data, and outputs the digital data as a captured image to the storage unit 1002.

The imaging system 1004 includes an imaging optical system including a lens, an imaging element, and the like, a pan-tilt-zoom mechanism that controls the imaging direction and the angle of view.

An audio input unit (input unit) 1005 includes an audio input device, such as a microphone or a terminal to which an audio input device is connectable, and acquires sounds. The acquired sounds are encoded and distributed by a communication unit 1007 described below to the client apparatus 2000.

An audio output unit 1006 includes an audio output device, such as a speaker or a terminal to which an audio output device is connectable, and outputs sounds. The audio output unit 1006 decodes the encoded sounds from the client apparatus 2000 received by the communication unit 1007 described below, and outputs the decoded sounds.

The communication unit 1007 is used to, via the network 3000, receive setting value changes and control commands from the client apparatus 2000, transmit responses to the commands, image data stored in the storage unit 1002, and sounds acquired by the audio input unit 1005 to the client apparatus 2000, and transmit various kinds of data, such as a notification event, generated by an event generation unit 1009 described below to the client apparatus 2000. The communication unit 1007 is also used to receive sounds from the client apparatus 2000.

An audio communication request input unit 1008 includes a button or a switch. The button or switch receives a request for establishment of a session. In response to receipt of an input via the audio communication request input unit 1008, that is, in response to receipt of a request for establishment of a session on the switch or button operated by the user of the camera 1000, the event generation unit 1009 described below generates an event.

The event generation unit 1009 generates an event defined in the Open Network Video Interface Forum (ONVIF) standard in response to an input via the audio communication request input unit 1008. The event generation unit 1009 then transmits the generated event to the client apparatus 2000 via the communication unit 1007.

While, the internal configuration of the camera 1000 has been described above with reference to FIG. 2, the processing blocks illustrated in FIG. 2 are a desirable example of an information processing apparatus in the present disclosure, and the present disclosure is not limited to the example. The present disclosure can be modified and changed in various manners in the scope of gist of the present disclosure, in a manner such that the audio communication request input unit 1008 is not provided and an audio input or captured video is used as a trigger of event generation.

Figure 3:
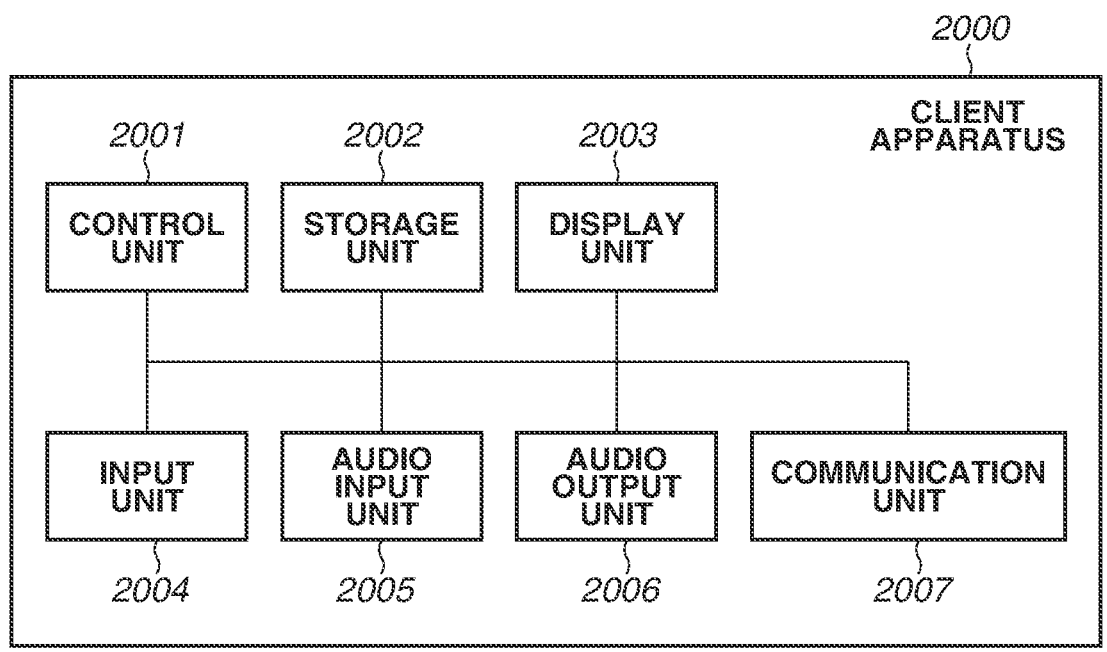
FIG. 3 is a block diagram illustrating an internal configuration of a client apparatus according to the exemplary embodiment of the present disclosure.

FIG. 3 is a block diagram illustrating an internal configuration of the client apparatus 2000.

A control unit 2001 includes a CPU, for example, and controls operation of the client apparatus 2000.

A storage unit 2002 is used as a storage region of programs that is executed mainly by the control unit 2001, a work area during execution of a program, and a storage area of various kinds of data, such as information on connectable cameras currently existing on the network 3000.

A display unit 2003 includes a liquid crystal display (LCD) or an organic electroluminescence (EL) display, or the like, for example, and displays various setting screens, data acquisition and display screens, viewer of video images received from the camera 1000, events received from the camera 1000, various messages, and the like.

An input unit 2004 includes a button, a four-direction key, a touch panel, a mouse, and the like, for example, and notifies the control unit 2001 of contents of screen operations performed by the user.

An audio input unit 2005 includes an audio input device, such as a microphone or a terminal to which an audio input device is connectable, and acquires sounds. The acquired sounds are encoded and distributed by a communication unit 2007 described below to the camera 1000.

An audio output unit 2006 includes an audio output device, such as a speaker or a terminal to which an audio output device is connectable, and outputs sounds. The audio output unit 2006 decodes the encoded sounds from the camera 1000 received by the communication unit 2007 described below, and outputs the decoded sounds.

The communication unit 2007 is used to transmit various change commands including an imaging region change command to the camera 1000 via the network 3000, and receive responses to the change commands, and receive a video stream from the camera 1000 for monitoring.

While, the internal configuration of the client apparatus 2000 has been described above with reference to FIG. 3, the processing blocks illustrated in FIG. 3 are a desirable example of an information processing apparatus in the present disclosure, and the present disclosure is not limited to this example. The client apparatus 2000 can be modified and changed in various manners within the scope of the gist of the present disclosure, in a manner such that an image analysis processing unit and a video accumulation unit are also provided.

Next, a method for establishing a video and audio transmission and reception session using ONVIF commands according to the present exemplary embodiment will be described with reference to the sequence diagram in FIG. 4.

Figure 4:
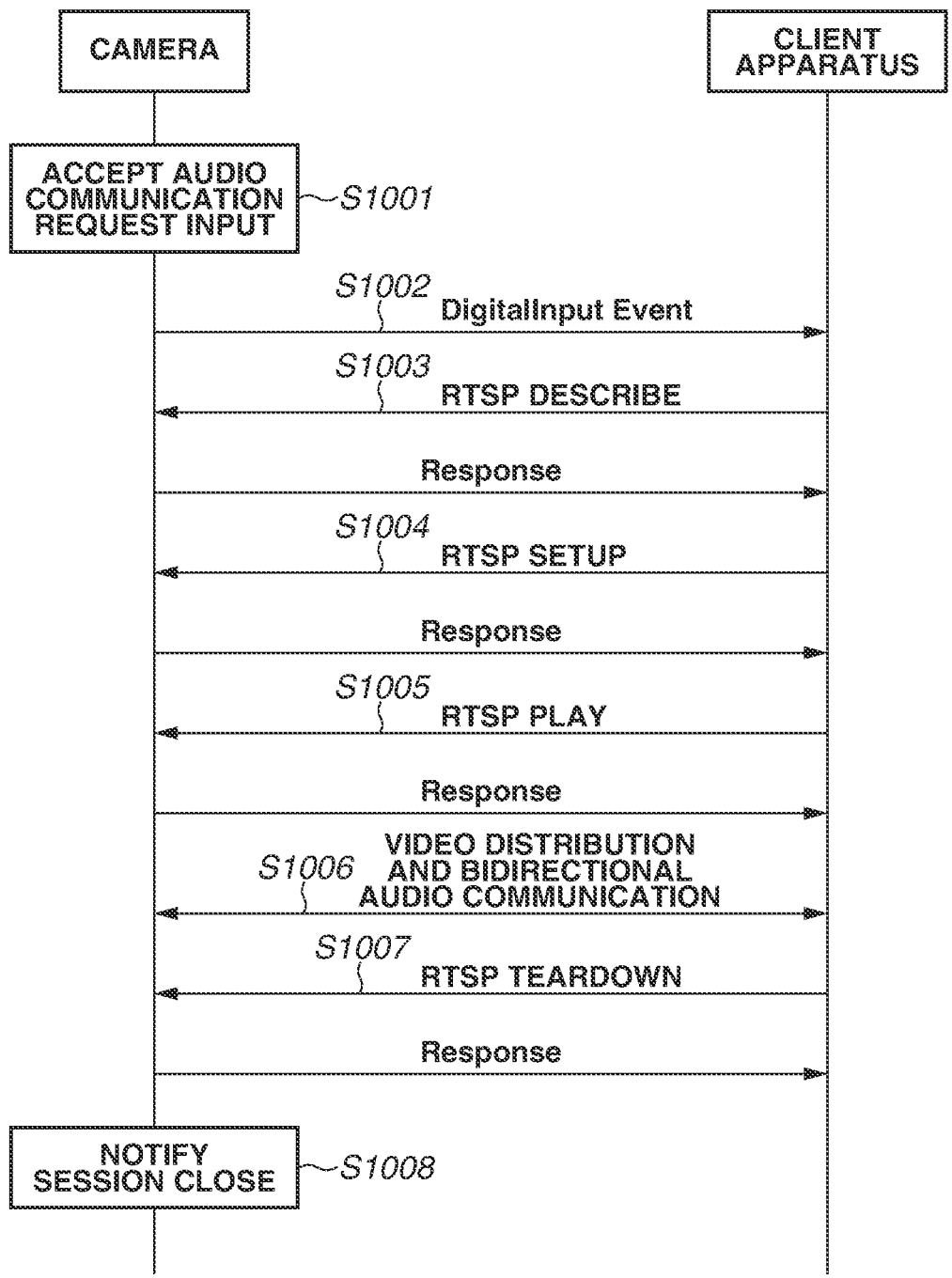
FIG. 4 is a sequence diagram illustrating a method for establishment of a video and audio transmission and reception session according to the exemplary embodiment of the present disclosure.

Processing in steps S1001, S1002, responses, and S1008 in FIG. 4 are executed and implemented by the control unit 1001 of the camera 1000.

Processing in steps S1003, S1004, S1005, and S1007 in FIG. 4 are executed and implemented by the control unit 2001 of the client apparatus 2000.

Video distribution in step S1006 in FIG. 4 is executed and implemented by the control unit 1001 of the camera 1000, and a bidirectional audio communication in step S1006 is executed and implemented by the control unit 1001 of the camera 1000 and the control unit 2001 of the client apparatus 2000.

In step S1001, the control unit 1001 accepts an input of an audio communication request from the user. In step S1002, the control unit 1001 transmits an event based on the input of the audio communication request. The processing in step S1001 is an application example of an acceptance unit of the present disclosure.

Figure 5:
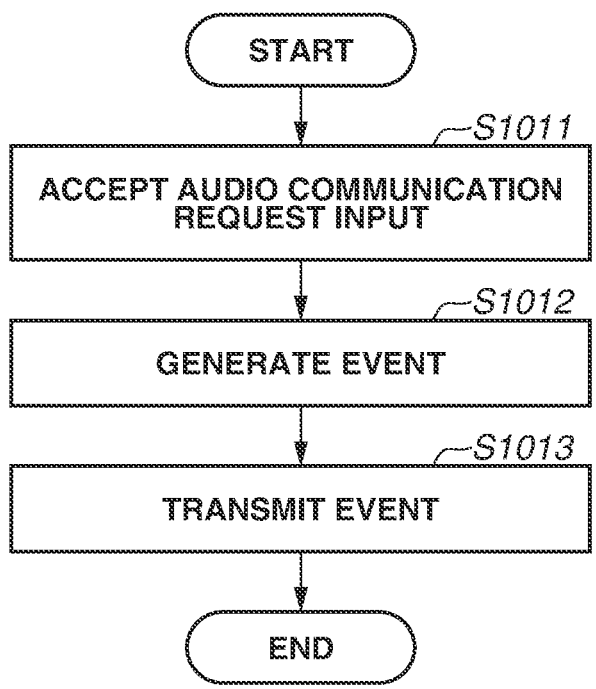
FIG. 5 is a flowchart of operations in response to input of audio communication according to the exemplary embodiment of the present disclosure.

Details of steps S1001 and S1002 will be described with reference to the flowchart in FIG. 5.

In step S1011 (S1001), the camera 1000 accepts a request from the user of the camera 1000 for establishment of a session between the camera 1000 and the client apparatus 2000. Specifically, the user of the camera 1000 who wishes to start audio communication with the user of the client apparatus 2000 presses the button included in the audio communication request input unit 1008. In response to the button included in the audio communication request input unit 1008 being pressed by the user of the camera 1000, the camera 1000 accepts an audio communication request (request for establishment of a session). In the present exemplary embodiment, an audio communication request (request for establishment of a session) is accepted in response to the pressing operation performed on the button as an example. Alternatively, the request for establishment of a session can be accepted in response to an input of a predetermined sound. The request for establishment of a session can also be accepted in response to detection of predetermined motion in a video (moving image) captured by the camera 1000.

In response to the camera 1000 accepting the audio communication request (request for establishment of a session) from the user of the camera 1000, the processing proceeds to step S1012. In step S1012, the camera 1000 generates an event.

In step S1012 (S1002), a digital input event defined in the ONVIF standard is generated.

The camera 1000 generates an event for notifying that the digital input state makes a transition, in the XML format defined in ONVIF standard.

A digital input event is generally used to notify a detection result detected by a sensor (external device) connected to an external contact input terminal of a camera (information digitally input from the external device) to a client apparatus. In the present exemplary embodiment, however, a digital input event is generated in response to acceptance of an audio communication request (request for establishment of a session).

As described above, in step S1012, the camera 1000 generates a notification (digital input event) compliant with the ONVIF standard as a notification for requesting establishment of a session.

In step S1013, the digital input event generated in step S1012 is transmitted as a notification for requesting establishment of a session to the client apparatus 2000.

In transmission of the event from the camera 1000 to the client apparatus 2000, the client apparatus 2000 needs to be in a state of an initial setting for establishment of an ONVIF connection between the camera 1000 and the client apparatus 2000 or a state in which the settings of the client apparatus 2000 is changed and the client apparatus 2000 is ready for accepting the event from the camera 1000 in.

The camera 1000 determines whether the client apparatus 2000 is ready for accepting the event. In a case where the client apparatus 2000 is ready for accepting the event, in step S1013 (S1002), the camera 1000 transmits the digital input event to the client apparatus 2000 in step S1002. The processing in step S1013 (S1002) is an application example of a transmission unit of the present disclosure.

Steps S1003, S1004, and S1005 are a sequence for establishment of a session for video distribution and bidirectional audio communication. The processing in steps S1003, S1004, and S1005 are an application example of an establishment unit of the present disclosure.

In step S1003, a DESCRIBE method as an RTSP request is transmitted.

The camera 1000 receives information (DESCRIBE method) that is to be used for establishment of a session and has been transmitted by the client apparatus 2000 in response to receipt of the digital input event (notification) transmitted in step S1002. Then, the camera 1000 executes a sequence to establish a session described below, to establish a session with the client apparatus 2000.

In response to the receipt of the digital input event in step S1002, the client apparatus 2000 outputs a display or sound indicating the receipt of the event, and transmits the DESCRIBE method to the camera 1000 by an operation performed by the user of the client apparatus 2000. Alternatively, the client apparatus 2000 automatically transmits the DESCRIBE method in response to the receipt of the digital input event.

The DESCRIBE method retrieves information on videos and sounds distributed by the camera 1000.

Next, the camera 1000 having received the DESCRIBE method describes, in a session description in the Session Description Protocol (SDP) form, information indicating that audio reception and transmission are both supported, and transmits the session description as a response to the client apparatus 2000.

In step S1004, a SETUP method as an RTSP request is transmitted.

The SETUP method requests establishment of an RTSP session for distribution (hereinafter, also simply called session).

The client apparatus 2000 transmits, to the camera 1000, a Uniform Resource Identifier (URI) containing information on a stream on which a session is to be established, based on the information acquired in step S1003.

In this processing, in step S1004, the client apparatus 2000 transmits the SETUP method with which both audio transmission and audio reception to the camera 1000 are to be enabled.

In response to receipt of the SETUP method, the camera 1000 establishes a session for video distribution and bidirectional audio communication, and transmits session information as a response to the client apparatus 2000.

In step S1005, a PLAY method as an RTSP request is transmitted.

The PLAY method requests the camera 1000 to start video distribution and bidirectional audio communication.

In response to receipt of the PLAY method, the camera 1000 starts video distribution and bidirectional audio communication, and transmits information on the success or failure of the distribution start as a response to the client apparatus 2000.

Once the distribution start has succeeded, in step S1006, the video distribution is performed by the camera 1000, and audio transmission and reception are performed between the camera 1000 and the client apparatus 2000.

In this processing, the camera 1000 can notify the user of the camera 1000 that the session has been established and video distribution and audio transmission and reception are enabled. Examples of the means for notifying the user include reproducing a specific sound through an audio output unit. This processing is an application example of a notification unit of the present disclosure, and is performed when a session with the client apparatus 2000 has been established, to notify the user of the camera 1000 (imaging apparatus) that the session has been established.

In step S1007, a TEARDOWN method as an RTSP request is transmitted. The TEARDOWN method requests a stop of transmission and reception of videos and sounds.

The user of the client apparatus 2000 specifies a session to be closed, and the client apparatus 2000 transmits the TEARDOWN method for the specified session.

In response to receipt of the TEARDOWN method, the camera 1000 performs processing for stopping transmission and reception of videos and sounds and processing for closing the session in accordance with the request, and transmits information on the success or failure of the processing as a response to the client apparatus 2000.

In step S1008, the user wearing the camera 1000 is notified that the session has been closed. The processing in step S1008 is an application example of a notification unit of the present disclosure, and is performed when the session with the client apparatus 2000 has been closed, to notify the user of the camera 1000 (imaging apparatus) of the closure of the session.

Examples of the means for notifying the user include outputting a sound indicating the closure of the session from the audio output unit 1006, illuminating an LED or the like separately provided to indicate the closure of the session.

The closure of the session has conventionally not been notified to the user wearing the camera 1000. However, with the processing in step S1008, the user can recognize the closure of bidirectional audio communication and request re-establishment of a session by inputting an audio communication request again.

The method for establishing a video and audio transmission and reception session using the ONVIF commands according to the present exemplary embodiment has been described with reference to FIGS. 4 and 5. The steps described in FIGS. 4 and 5 are a desirable example of the present exemplary embodiment of internal processing in the present disclosure, and the present disclosure is not limited to this example.

The processing in the audio communication request input in step S1001 can be modified such that the camera 1000 generates a sound detection event in step S1012 in response to receipt of utterance of a specific character string from the user via the audio input unit 1005, or the camera 1000 analyzes a video generated by the imaging unit 1003 to detect a start of a motion from at rest and generates a video change detection event.

In the present exemplary embodiment, in response to the acceptance of a request for establishing a session, the camera 1000 transmits a digital input event defined in the ONVIF standard as a notification that requests establishment of a session to the client apparatus 2000. Instead of the digital input event, the notification can be performed in response to such an event that the camera 1000 detects (by a detection unit) a predetermined change in at least one of a sound input by the audio input unit 1005 and a video captured by the audio input unit 1005, and in a case where the predetermined change is detected, the camera 1000 makes a notification to the client apparatus 2000.

Instead of using the TEARDOWN method in step S1007 as a trigger, the transmission and reception of videos and sounds can be stopped in response to a request for stopping distribution input by the camera.

The present disclosure can be modified and changed in various manners, within the scope of gist of the present disclosure, such as a camera not worn by a user.

As described above, in the present exemplary embodiment, notifications compliant with the ONVIF standard are used and a session between an imaging apparatus (camera) and a client apparatus can be established based on a request from the imaging apparatus.

Further, notification of a request for re-establishment of a session to the client apparatus can also be performed by using the ONVIF functions.

The desirable examples of the exemplary embodiment of the present disclosure have been described as above. However, the present disclosure is not limited to these exemplary embodiments, and can be modified and changed in various manners within the scope of gist of the present disclosure.

Other Exemplary Embodiments

The present disclosure can be implemented by supplying a program realizing one or more functions in the above-described exemplary embodiments to a system or an apparatus via a network or a storage medium, and reading and executing the program by one or more processors in the system or apparatus. Alternatively, the present disclosure can be implemented by a circuit realizing one or more functions (for example, an application specific integrated circuit (ASIC)).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-061233, filed Mar. 31, 2022, which is hereby incorporated by reference herein in its entirety.

What is claimed is:

1. An imaging apparatus that is capable of audio communication with a client apparatus in an established session with the client apparatus, the imaging apparatus comprising:
one or more processors;
one or more memories including instructions stored thereon that, when executed by the one or more processors, cause the imaging apparatus to function as:
an establishment unit configured to establish a session with the client apparatus by initiating a request for establishment of the session from a user wearing the imaging apparatus;
an acceptance unit configured to accept the request for establishment of the session from the user;
a generating unit configured to generate a notification compliant with the Open Network Video Interface Forum (ONVIF) standard as a digital input event defined in the ONVIF standard at the imaging apparatus upon acceptance of the request;
a determination unit configured to determine whether the client apparatus is ready to accept the digital input event, the determination being made at the imaging apparatus; and
a transmission unit configured to transmit, in a case where the acceptance unit accepts the request for establishment of the session, the digital input event to the client apparatus as a notification that requests establishment of the session,
wherein the establishment unit establishes the session with the client apparatus by receiving information to be used for establishment of the session, the information being transmitted by the client apparatus in response to receipt of the notification transmitted by the transmission unit, and
wherein the information to be used for establishment of the session is information of a Real Time Streaming Protocol (RTSP) request.

2. The imaging apparatus according to claim 1, wherein the digital input event is an event to notify the client apparatus of information digitally input from an external device.

3. The imaging apparatus according to claim 1, wherein the information to be used for establishment of the session includes information of a DESCRIBE method.

4. The imaging apparatus according to claim 1, further comprising:
an imaging unit;
an input unit configured to input a sound; and
a detection unit configured to detect a predetermined change in at least one of the sound input by the input unit and a video captured by the imaging unit,
wherein the notification compliant with the ONVIF standard is an event for performing, in a case where the detection unit detects the predetermined change, a notification to the client apparatus.

5. The imaging apparatus according to claim 1,
wherein the acceptance unit includes a switch or button to accept the request for the establishment of the session from the user, and
wherein the acceptance unit accepts the request for the establishment of the session in response to an operation performed on the switch or button by the user.

6. The imaging apparatus according to claim 1, wherein the acceptance unit accepts the request for the establishment of the session in response to input of a predetermined sound.

7. The imaging apparatus according to claim 1, wherein the acceptance unit accepts the request for the establishment of the session in response to detection of a predetermined operation.

8. The imaging apparatus according to claim 1, further comprising a notification unit configured to notify, in a case where the session with the client apparatus is established, the establishment of the session to the user of the imaging apparatus.

9. The imaging apparatus according to claim 8, wherein, in a case where the session with the client apparatus is closed, the notification unit notifies the closure of the session to the user of the imaging apparatus.

10. The imaging apparatus according to claim 1, wherein the imaging apparatus is a user-wearable necklace-type camera.

11. A control method of an imaging apparatus, the control method comprising:
establishing a session with a client apparatus by initiating a request for establishment of the session from a user wearing the imaging apparatus;
accepting the request for establishment of the session from the user; and
generating a notification compliant with the ONVIF standard as a digital input event defined in the ONVIF standard at the imaging apparatus upon acceptance of the request;
determining whether the client apparatus is ready to accept the digital input event, the determination being made at the imaging apparatus; and
transmitting, in a case where the request for establishment of the session is accepted, the digital input event to the client apparatus as a notification that requests establishment of the session,
wherein the session with the client apparatus is established by receiving information to be used for establishment of the session, the information being transmitted by the client apparatus in response to receipt of the notification transmitted, and
wherein the information to be used for establishment of the session is information of a Real Time Streaming Protocol (RTSP) request.

12. A non-transitory computer readable storage medium including a program for executing a control method of an imaging apparatus, the control method comprising:
establishing a session with a client apparatus by initiating a request for establishment of the session from a user wearing the imaging apparatus;
accepting the request for establishment of the session from the user; and
generating a notification compliant with the ONVIF standard as a digital input event defined in the ONVIF standard at the imaging apparatus upon acceptance of the request;
determining whether the client apparatus is ready to accept the digital input event, the determination being made at the imaging apparatus; and
transmitting, in a case where the request for establishment of the session is accepted, the digital input event to the client apparatus as a notification that requests establishment of the session,
wherein the session with the client apparatus is established by receiving information to be used for establishment of the session, the information being transmitted by the client apparatus in response to receipt of the notification transmitted, and
wherein the information to be used for establishment of the session is information of a Real Time Streaming Protocol (RTSP) request.

* * * * *